United States Patent [19]

Wurdack et al.

[11] Patent Number: 4,804,899

[45] Date of Patent: Feb. 14, 1989

[54] ANTENNA ROTATOR CONTROLLERS AND CONVERSION SYSTEMS THEREFOR

[75] Inventors: Gerard A Wurdack; Frank F. Helton, both of St. Louis, Mo.

[73] Assignee: Gerard A. Wurdack & Associates, Inc., St. Louis County, Mo.

[21] Appl. No.: 51,497

[22] Filed: May 18, 1987

[51] Int. Cl.[4] .............................................. G05B 19/26
[52] U.S. Cl. ................................... 318/600; 318/601; 318/637; 343/757; 343/763; 343/766
[58] Field of Search .............. 318/565, 600, 601, 560, 318/648, 649, 671, 685, 681; 343/761, 715, 882, 903, 757, 763, 766

[56] References Cited

U.S. PATENT DOCUMENTS

| | | | |
|---|---|---|---|
| 3,795,851 | 3/1974 | Gage et al. | 318/600 |
| 4,077,000 | 2/1978 | Grubbs | 318/673 |
| 4,100,472 | 7/1978 | Mobley | 318/685 |
| 4,109,191 | 8/1978 | Callaghan | 318/673 |
| 4,156,241 | 5/1979 | Mobley et al. | 318/649 |
| 4,263,539 | 4/1981 | Barton | 318/664 |
| 4,330,782 | 5/1982 | Hashimoto et al. | 318/468 |
| 4,496,890 | 1/1985 | Wurdack et al. | 318/600 |
| 4,542,326 | 9/1985 | Hornback | 318/565 |
| 4,584,511 | 4/1986 | Rudich et al. | 318/600 |

*Primary Examiner*—William M. Shoop, Jr.
*Assistant Examiner*—Brian Young
*Attorney, Agent, or Firm*—Senniger, Powers, Leavitt and Roedel

[57] ABSTRACT

A conversion system for a controller for an antenna rotator which includes circuitry for generating an analog signal which varies as a function of the angular position of the antenna. The conversion system includes circuitry for converting the analog signal to a corresponding first digital signal representative of the angular position of the antenna relative to a first reference heading of the antenna. The conversion system also includes storage circuitry having a prestored table of digital values of angular positions of the antenna relative to a second reference heading of the antenna and which in response to the first digital signal produces a second digital signal corresponding to one of the prestored digital values, the second digital signal thereby being representative of the angular position of the antenna relative to the second reference heading. A digital display system and controller for an antenna rotator are also disclosed.

23 Claims, 3 Drawing Sheets

FIG. I.

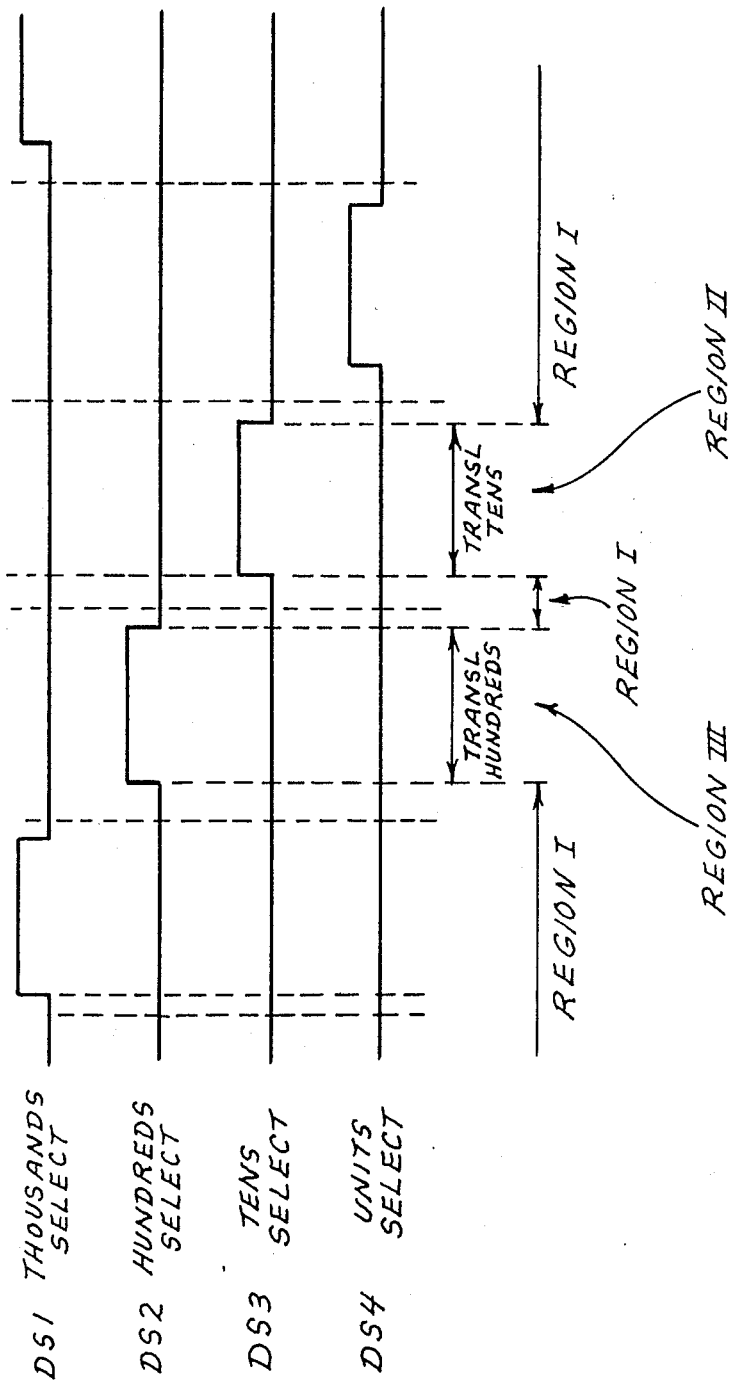

ANTENNA ROTATOR CONTROLLERS AND CONVERSION SYSTEMS THEREFOR

BACKGROUND OF THE INVENTION

This invention relates to controllers for antenna rotators and conversion systems for antenna rotator controllers.

Antenna rotators include antenna position sensors, typically a potentiometer which has a voltage applied thereto, for producing an analog signal representative of the heading or angular position antenna. The analog signal is supplied to an antenna rotator controller with a deflecting meter having a scale calibrated in degrees, or it may be converted to a digital signal for a digital display of the antenna heading with relation to a fixed reference heading (e.g., degrees relative to a South reference).

Antenna rotators generally have stops limiting their travel to approximately one revolution to prevent damage to cables connected to the antenna. It is often undesirable for the stop to be at due North, which correlates with a South Center fixed reference heading. For example, to change the heading of an antenna situated in central United States from Europe (Northeast) to Asia (Northwest) will require approximately 270° of rotation if the stop is at due North. If, however, the rotator stop is at due South (which correlates with a North Center fixed reference heading) only a 90° change in heading is required thereby reducing the time required to change the antenna heading from northeast to northwest. Thus many users or operators of antenna controllers may want a fixed reference heading different from whichever one is provided by the manufacturer.

Not only is it advantageous for an antenna controller to provide the user with two different selectable reference headings, but it is also desirable to enable the users of many existing antenna controllers to convert them inexpensively and conveniently so as to have two selectable reference headings and to provide a digital display to replace the original deflecting meter type of analog display of headings.

SUMMARY OF THE INVENTION

Among the several objects of the invention may be noted the provision of a conversion system for converting the angular position of the antenna relative to a first reference heading to its angular position relative to a second reference heading; the provision of such a conversion system which provides two selectable reference headings, e.g. both North and South center; the provision of such a conversion system which may be easily and conveniently installed in an existing antenna controller; the provision of such a conversion system which may include a digital display; and the provision of antenna rotator controllers and conversion systems therefor which are simple in circuitry, economical and reliable in operation.

Briefly, a conversion system of the present invention is for a controller for an antenna rotator including means for generating an analog signal which varies as a function of the angular position of the antenna. The conversion system includes means for converting the analog signal to a corresponding first digital signal representative of the angular position of the antenna relative to a first reference heading of the antenna. The conversion system also includes a storage means having a prestored table of digital values of angular positions of the antenna relative to a second reference heading of the antenna and which in response to the first digital signal produces a second digital signal corresponding to one of the prestored digital values, the second digital signal thereby being representative of the angular position of the antenna relative to the second reference heading.

Other objects and features will be in part apparent and in part pointed out hereinafter.

BRIEF DESCRIPTION OF THE DRAWINGS

FIG. 3 is a diagram illustrating the timing at certain points in the schematic of FIG. 2.

Corresponding reference characters indicate corresponding parts throughout the several views of the drawings.

DETAILED DESCRIPTION OF PREFERRED EMBODIMENT

Figure 1:
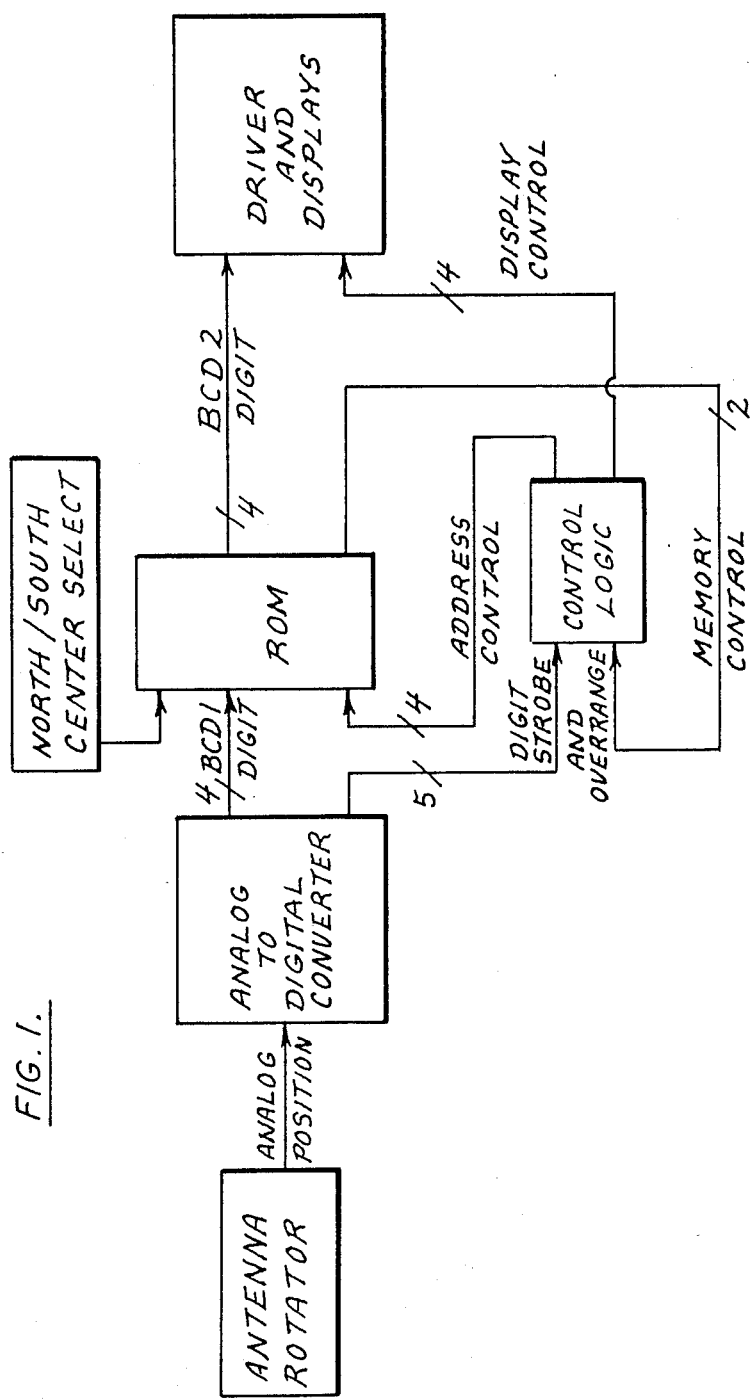
FIG. 1 is a block diagram of the conversion system of the present invention shown with an antenna controller and display.

Referring to FIG. 1, an Antenna Rotator, e.g., Telex Model T2X which may be mounted on an antenna tower (not shown), is used to rotate an antenna (not shown) mounted on the rotator. A controller (not shown) for the rotator produces controls to operate motors and brakes on the rotator. A detailed description of such an antenna installation is described in U.S. Pat. No. 4,496,890, incorporated herein by reference. An analog signal or Analog Position is generated by the antenna rotator and has a voltage which is proportional to the angular position of the antenna relative to a reference heading, e.g., South Center operation. An Analog to Digital Converter (A/D conv.) converts the analog signal (Analog Position) to a sequence of binary coded digital values or signals (BCD1), also produces digital signals (DIGIT STROBE) indicative of which one of the digital values in the sequence is appearing on BCD1, and produces an overrange indication signal (OVERRANGE). The A/D Conv. thus produces digital signals representative of the heading of the antenna relative to the reference heading e.g. South center operation. In this way the A/D Conv. is an example of means for converting the analog signal (Analog Position) to a corresponding first digital signal representative of the angular position of the antenna relative to a first reference heading of the antenna. The A/D Conv. is also an example of means responsive to the analog signal for producing sequences of digital values and for generating control signals identifying which one of the sequence of digital values is being produced, each sequence of digital values being representative of the angular position of the antenna relative to the first reference heading (south center) of the antenna.

A Read Only Memory (ROM) has address lines which receive the BCD1 values, a North/South center select and Address Control from Control Logic. The North/South Center Select permits the selection of whether the output of the ROM is North center, i.e., translation of the North Center values or South center, i.e., produce digits identical to BCD1.

Control Logic receives the DIGIT STROBE and OVERRANGE signals as well as output data signals (MEMORY CONTROL) from the ROM. In response to these signals the Control Logic produces the Address Control signal for addressing the ROM and also produces control signals (DISPLAY CONTROL) for the Driver and Displays. In response to BCD1, ADDRESS CONTROL and NORTH/SOUTH CENTER SELECT, the ROM produces a digital signal from a prestored table of digital values of angular positions of the antenna relative to a first or second reference heading (North or South Center) of the antenna, the digital signal corresponding to one of the prestored digital values. The digital signal from the ROM is output on the Memory Control and a binary coded digit (BCD2). The Driver and Displays are responsive to BCD2 and DISPLAY CONTROL. The display shows values representative of the angular position of the antenna relative to the first or second reference heading depending on the North/South Center select.

The detailed circuitry shown in FIG. 2 and the timing diagram of FIG. 3 will now be discussed. The A/D Conv. receives the Analog Position from the Antenna Rotator which includes a potentiometer 21 connected between +5 v and common. The wiper of potentiometer 21 moves with the change in angular position of the antenna and thus voltage is generated at the wiper and will vary as a function of the angular position of the antenna. A voltage divider network including resistors 23 and 25 provides a reduced voltage signal, filtered by capacitor 27, to the analog voltage input Vx of the A/D Conv.

The A/D Conv. is a commercially available 3½ digit CMOS device, e.g. type number MC14433. The A/D Conv. presents the digital readings one digit at a time—thousands first, units last and is a "3½ digit" type circuit. The A/D Conv. produces a sequence of digits on the of BCD output (Q0-Q3) resulting from the conversion and also produces digit strobe signals (DS1-DS4) indicative of which one of the digits in the sequence is being output. In this way the A/D Conv. is an example of means for producing binary coded digits representative of the angular position relative to the first (south center) reference heading.

The interconnection of the Control Logic to other portions of the circuitry shown in FIG. 2 will now be described. DS1 (thousand select) is connected to a clock input C of a D-type flip flop 31. The data input D of flip flop 31 is connected to output data D0 of the ROM. Output Q of flip flop 31 is connected to address input A0 of the ROM. DS2 (hundreds select) is connected to both an address input A2 of the ROM and to driver 35. DS3 (tens select) is connected to an address input A3 of the ROM, to driver 37 and to a clock input C of a D-type flip flop 33. The data input D of flip flop 33 is connected to output data D1 (OUT1) of the ROM. Output Q of flip flop 33 is connected to an address input A1 of the ROM. DS4 (units select) is connected to a driver 39. Overrange output OR of the A/D Conv. is connected to an overrange input of a BCD to seven segment driver 41.

The ROM has four address inputs A4–A7 connected to the BCD outputs Q0–Q3 respectively, i.e., BCD1. Another address input A8 is connected to a North/South Select jumper 45 for selective grounding of input A8 and pull up resistor 47 for holding input A8 at a logic high. The ROM may be one of various commercially available types having 2k bytes. For example, a 2732A EPROM, 2764, 27128, 2716, or 2732 may be used. As will be seen about 512 bytes of memory are required for the ROM.

The output data lines D4–D7 represent a second binary coded decimal output BCD2. As described below, BCD2 may either be the South Center operation, i.e., no translation of the digits occurs, or North center operation, i.e., the translation of the digits occurs. BCD2 is connected to the input of the BCD to seven segment driver 41. Digital Displays 51 show the three digits output by the driver 41 and each digit is enabled by a corresponding one of the drivers 35, 27, and 39. For example, the most significant digit is enabled by the output of driver 35. The ROM is thus an example of means for producing binary coded digits representative of the angular position relative to the second (north center) reference heading.

The ROM stores the information necessary for the conversion of th BCD1 digit (South center operation) to the BCD2 digit (selectable North or South center operation. The units digit from the A/D Conv. (BCD1) always corresponds to the output digit from the ROM (BCD2) regardless of North or South center operation and no translation is necessary. The translation from South center to North center operation requires the following for hundreds and tens digits:

TABLE I

| BCD1 | BCD2 | BCD1 | BCD2 |
|------|------|------|------|
| 00 | 18 | 18 | 00 |
| 01 | 19 | 19 | 01 |
| 02 | 20 | 20 | 02 |
| 03 | 21 | 21 | 03 |
| 04 | 22 | 22 | 04 |
| 05 | 23 | 23 | 05 |
| 06 | 24 | 24 | 06 |
| 07 | 25 | 25 | 07 |
| 08 | 26 | 26 | 08 |
| 09 | 27 | 27 | 09 |
| 10 | 28 | 28 | 10 |
| 11 | 29 | 29 | 11 |
| 12 | 30 | 30 | 12 |
| 13 | 31 | 31 | 13 |
| 14 | 32 | 32 | 14 |
| 15 | 33 | 33 | 15 |
| 16 | 34 | 34 | 16 |
| 17 | 35 | 35 | 17 |
|  |  | 36 | 18 |

For BCD1 outputs of 00 thru 17 (left semicircle), the tens digit should be translated as follows:

TABLE II

| TENS IN BCD1 | TENS OUT BCD2 |
|--------------|---------------|
| 0 | 8 |
| 1 | 9 |
| 2 | 0 |
| 3 | 1 |
| 4 | 2 |
| 5 | 3 |
| 6 | 4 |
| 7 | 5 |
| 8 | 6 |
| 9 | 7 |

The translation of the hundreds digit for BCD1 outputs of 00 thru 17 (left semicircle) depends on both the tens and hundreds input:

TABLE III

| TENS IN BCD1 | HUNDREDS IN BCD1 | HUNDREDS OUT BCD2 |
|--------------|------------------|-------------------|
| 0,1 | 0 | 1 |
| 0,1 | 1 | 2 |

TABLE III-continued

| TENS IN BCD1 | HUNDREDS IN BCD1 | HUNDREDS OUT BCD2 |
|---|---|---|
| 2-9 | 0 | 2 |
| 2-7 | 1 | 3 |

For BCD1 hundreds and tens digit values 18 thru 36, a different translation is required (right semicircle)

TABLE IV

| TENS IN BCD1 | TENS OUT BCD2 |
|---|---|
| 0 | 2 |
| 1 | 3 |
| 2 | 4 |
| 3 | 5 |
| 4 | 6 |
| 5 | 7 |
| 6 | 8 |
| 7 | 9 |
| 8 | 0 |
| 9 | 1 |

The translation of the hundreds digit for BCD1 outputs of 18 thru 36 (right semicircle) depends on both the tens and hundreds input:

TABLE V

| TENS IN BCD1 | HUNDREDS IN BCD1 | HUNDREDS OUT BCD2 |
|---|---|---|
| 0-7 | 2 | 0 |
| 0-6 | 3 | 1 |
| 8,9 | 1 | 0 |
| 8,9 | 2 | 1 |

As shown in FIG. 3 the digit strobe signals (DS1-DS4) go to a logic high during certain periods of time. The following definitions are useful in describing the operation of the invention:

Region I: This time period includes the time during which the thousands digit (half digit) or the units digit is being output on BCD1 and also includes the time period between Region III and II.

Region II: This time period includes the time during which the tens digit is being output on BCD1.

Region III: This time period includes the time during which the hundreds digit is being output on BCD1

Figure 2:
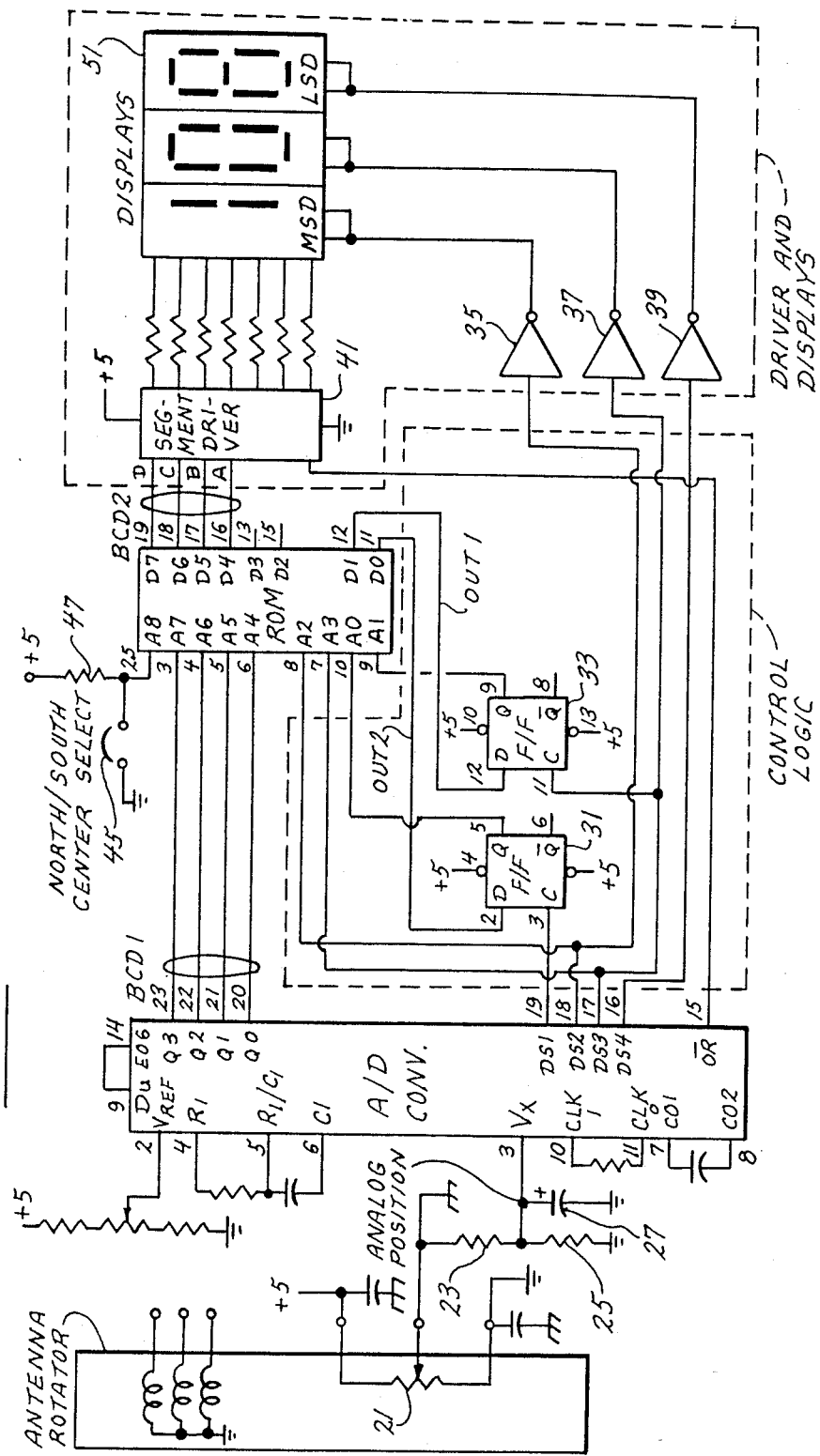
FIG. 2 is a schematic of the system shown in FIG. 1.

Referring to both FIGS. 2 and 3, during Region I, the ROM coding does the following:
(1) DIGIT OUT (BCD2)=DIGIT IN (BCD1).
(2) (a) IF DIGIT IN (BCD1)=0 or 1, and flip flop 31 is set, OUT 1 (D1) is set.
 (b) IF DIGIT IN (BCD1)=8 or 9, and flip flop 31 is clear, OUT 1 (D1) is set.
 (c) Otherwise, OUT 1 (D1) is clear.
(3) (a) IF DIGIT IN (BCD1)=B or F (hex) then OUT 2 (D0) is set.
 (b) Otherwise, OUT 2 (D0) is clear.

During region II (tens translation), either the translation of Table II or Table IV is done, depending on flip flop 31 (left or right semicircle).

During region III (hundreds translation), either the translation of Table III or Table V is done, depending on flip flops 31 and 33.

Signals to the address inputs of the ROM data signals output from the ROM are assigned as follows:

TABLE VI

| Address | Meaning |
|---|---|
| A8 | NORTH CENTER (LOW)/SOUTH CENTER (HIGH) |
| A7 | Binary Coded Digit (MSB) (A/D Q3) |
| A6 | Binary Coded Digit (A/D Q2) |
| A5 | Binary Coded Digit (A/D Q1) |
| A4 | Binary Coded Digit (LSB) (A/D Q0) |
| A3 | TENS SELECT |
| A2 | HUNDREDS SELECT |
| A1 | HUNDREDS TRANSLATION CONTROL MEMORY (Q output of Flip Flop 33) |
| A0 | SEMICIRCLE MEMORY (Q Output of Flip Flop 31) |
| A14 | 1 |
| A13 | 1 |
| A12 | 1 |
| A11 | 1 |
| A10 | 0 |
| A9 | 0 |

TABLE VII

| Data | Meaning |
|---|---|
| D7 | Binary Coded Digit (MSB) (D) |
| D6 | Binary Coded Digit (C) |
| D5 | Binary Coded Digit (B) |
| D4 | Binary Coded Digit (LSB) (A) |
| D3 | NOT USED |
| D2 | NOT USED |
| D1 | HUNDREDS CONTROL DECODE (OUT 1) |
| D0 | SEMICIRCLE DECODE (OUT 2) |

In order to accomplish the translation of digits the ROM has the following prestored tables of digital values of angular positions relative to reference headings for North or South Center operation.

TABLE VIII (North Center)

| Address | 0 | 1 | 2 | 3 | 4 | 5 | 6 | 7 | 8 | 9 | A | B | C-F |
|---|---|---|---|---|---|---|---|---|---|---|---|---|---|
| 0800 | 00 | 02 | 00 | 02 | FF | 20 | FF | 10 | 20 | 80 | 20 | 80 | FF |
| 0810 | 10 | 12 | 10 | 12 | FF | 30 | 00 | 20 | 30 | 90 | 30 | 90 | FF |
| 0820 | 20 | 20 | 20 | 20 | 00 | FF | 10 | FF | 40 | 00 | 40 | 00 | FF |
| 0830 | 30 | 30 | 30 | 30 | 10 | FF | 20 | FF | 50 | 10 | 50 | 10 | FF |
| 0840 | 40 | 40 | 40 | 40 | 20 | FF | 30 | FF | 60 | 20 | 60 | 20 | FF |
| 0850 | 50 | 50 | 50 | 50 | 30 | FF | 40 | FF | 70 | 30 | 70 | 30 | FF |
| 0860 | 60 | 60 | 60 | 60 | 40 | FF | 50 | FF | 80 | 40 | 80 | 40 | FF |
| 0870 | 70 | 70 | 70 | 70 | 50 | FF | 60 | FF | 90 | 50 | 90 | 50 | FF |
| 0880 | 82 | 80 | 82 | 80 | 60 | FF | 70 | FF | 00 | 60 | 00 | 60 | FF |
| 0890 | 92 | 90 | 92 | 90 | 70 | FF | 80 | FF | 10 | 70 | 10 | 70 | |
| 08A0 | 00 | 00 | 00 | 00 | | | | | FF's | | | | |
| 08B0 | 01 | 01 | 01 | 01 | | | | | FF's | | | | |
| 08C0 | 00 | 00 | 00 | 00 | All FF (unprogrammed state). | | | | | | | | |
| 08D0 | 00 | 00 | 00 | 00 | | | | | FF's | | | | |
| 08E0 | 00 | 00 | 00 | 00 | | | | | FF's | | | | |
| 08F0 | 01 | 01 | 01 | 01 | | | | | FF's | | | | |

TABLE IX (South Center)

| Address | 0 | 1 | 2 | 3 | 4 | 5 | 6 | 7 | 8 | 9 | A | B | C-F |
|---|---|---|---|---|---|---|---|---|---|---|---|---|---|
| 0900 | 00 | 00 | 00 | 00 | 00 | 00 | 00 | 00 | 00 | 00 | 00 | 00 | FF |
| 0910 | | | | | | 10 | | | | | | | FF |
| 0920 | | | | | | 20 | | | | | | | FF |
| 0930 | | | | | | 30 | | | | | | | FF |
| 0940 | | | | | | 40 | | | | | | | FF |
| 0950 | | | | | | 50 | | | | | | | FF |
| 0960 | | | | | | 60 | | | | | | | FF |
| 0970 | | | | | | 70 | | | | | | | FF |
| 0980 | | | | | | 80 | | | | | | | FF |
| 0990 | 90 | 90 | 90 | 90 | 90 | 90 | 90 | 90 | 90 | 90 | 90 | 90 | FF |
| 09A0 | | | | | | FF | | | | | | | |

The "FF"s in Tables VIII and IX are unprogrammed states that do not effect the function of the translation. The TENS translation for BCD1 values greater than 360 are not normally used, but are advantageously provided to assist in calibration.

In this way the ROM stores digital values and thus constitutes storage means having a prestored table of digital values of angular positions of the antenna relative to a second (north center operation) reference heading of the antenna and which in response to a digital signal (from the A/D Conv.) produces a second digital signal corresponding to one of the prestored digital values, the second digital signal thereby being representative of the angular position of the antenna relative to the second reference heading.

The ROM also includes a prestored table of digital values of angular positions of the antenna relative to the first (south center operation) reference heading of the antenna. The North/South Center Select is thus an example of means for selecting either the first prestored digital values (north center operation) or the second prestored digital values (south center operation), to selectively generate a second digital signal representative of the angular position of the antenna relative to either the first (north center) or second (south center) reference headings.

The operation of the circuitry will now be described with particular reference to FIGS. 2 and 3. The North/South jumper select 45 is connected, as desired for either North or South center operation. Address A8 is connected to a logic low for North center operation or to a logic high for South center operation. For a South center display, digits are passed thru untranslated, regardless of the condition of the Control Logic.

The A/D Conv. sequentially produces digits in the conversion of the Analog Position on Vx. The A/D is calibrated so that as the Analog Position goes from values representative of 0° to 360°, the BCD1 digits will go from 000 to 360. The A/D Conv. produces the digits one at a time with the thousands value first and units last. The overrange condition is output by the A/D Conv. on a separate output OR. The segment driver 41 is thus blanked when an overrange condition occurs. The following discussion is particularly directed toward North center operation but as will be appreciated the South center operation is also accomplished.

As shown in FIG. 3, only one of the Data Strobe signals (DS1-DS4) is active at a given time. The A/D Conv. first produces the thousands digit (DS1 active). The thousands digit on BCD1 contains or is encoded with information on the sign (positive/negative) of the reading, indication of overrange condition and indication of the underrange condition. The underrange condition is detected for readings of less than 180 and is decoded to indicate that left semicircle translations (rather than right semicircle translations) should be done.

As will be easily appreciated by the skilled worker if the underrange indication is not provided, or if its boundary was at other than 180°, the A/D Conv. could be biased or connected to produce −180° through +180° readings. The sign could then be decoded to control left semicircle translations and the right semicircle would thus not require translation.

The DS1 active signal also causes flip flop 31 to be clocked to store the data appearing on D0 of the ROM. The output Q of flip flop 31 is thus set or clear and is used for processing the subsequent digits from the A/D Conv. to determine whether left semicircle or right semicircle translations are to be done for the hundreds and tens digits.

Next the hundreds select (DS2) is active and causes address A3 of the ROM to be a logic high. During Region III, as shown in FIG. 3, the hundreds digit appears on BCD1 and the ROM produces a digital signal on the data outputs (D0-D7) representative of the translated hundreds digit. The translation for North center operation occurs according to Table III or V depending on whether digits are left or right semicircle. The hundreds digit appears on BCD2 and is converted by the segment driver 41. With the DS2 signal active the control logic produces a control signal, the driver 35 is activated and the hundreds digit is on the display. As is understood from Tables II and IV the digital signal to be output on BCD2 is dependent on both the hundreds digit and tens digit on BCD1. Because of the sequential processing, the hundreds digit may be inaccurate the first time the translation occurs. But as will be readily appreciated such inaccuracy is quickly remedied by the subsequent processing of the tens digit.

A Region I period next occurs during which none of the display digits are active and thus any digit appearing on BCD2 will not be seen.

The tens digit is next converted in Region II when the DS3 line is active. Either the translation shown in Table II or IV occurs depending on whether there is a left or right semicircle. The translated BCD2 digit is converted by the segment driver 41 and a control signal from the control logic activates the driver 37 to enable the tens or middle digit of the display. With the DS3 line active the flip flop 33 of the control logic is clocked and the data appearing on D1 of the ROM is stored. The output Q of flip flop 33 thus stores a bit of information required for the translation of the hundreds digit for the next sequence of digits from the A/D Conv.

As is seen from the operation, the digits are produced sequentially and the invention advantageously stores information with the flip flops 31 and 33 to control the translation process. It will also be appreciated that the translation process, decoding of the underrange indication for left or right semicircle operation, and decoding the tens digit to control hundreds translation may all be accomplished by using an appropriately programmed ROM.

During the units select time period of Region I (DS4 is active) the digit appearing at BCD1 also appears on BCD2. The least significant digit of the display is activated by the driver 39 and the units digit appears.

The A/D Conv. then begins the generation or production of the sequence of digits again and the process continues repeatedly. In this way the invention advantageously presents a continuous display for operation of the antenna and provides the operator with either North or South center information. The Driver and Displays are thus an example of means responsive to a digital signal for displaying digits representative of the angular position of the antenna relative to a reference heading.

As will be appreciated the conversion system shown in FIGS. 1-3 conveniently digitally displays the headings of the antenna for both North and South Center operation. Such conversion system may advantageously be included in the controller for the antenna rotator.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A conversion system for a controller for an antenna rotator which includes means for generating an analog signal varying as a function of the angular position of the antenna, the conversion system comprising:

means for converting the analog signal to a corresponding first digital signal representative of the angular position of the antenna relative to a first reference heading of the antenna; and storage means having a prestored table of digital values of angular positions of the antenna relative to a second reference heading of the antenna and which in response to the first digital signal produces a second digital signal corresponding to one of the prestored digital values, the second digital signal thereby being representative of the angular position of the antenna relative to the second reference heading.

2. A conversion system as set forth in claim 1 wherein the converting means includes means responsive to the analog signal for producing sequences of digital values and for generating control signals identifying which one of the sequence of digital values is being produced, each sequence of digital values produced being representative of the angular position of the antenna relative to the first reference heading of the antenna.

3. A conversion system as set forth in claim 1 wherein the storage means produces sequences of digital values, each sequence of digital values being representative of the angular position of the antenna relative to the second reference heading of the antenna, and which system further comprises control logic for producing control signals identifying which one of the digital values in the sequence is being produced.

4. A conversion system as set forth in claim 3 wherein te converting means includes means responsive to the analog signal for producing second sequences of digital values and for generating second control signals identifying which one of the digital values in the second sequence is being produced, each second sequence of digital values being representative of the angular position of the antenna relative to the first reference heading of the antenna.

5. A conversion system as set forth in claim 4 wherein the control logic responds to the second control signals to identify which one of the digital values in the first named sequence is being produced.

6. A conversion system as set forth in claim 1 wherein the storage means includes another prestored table of digital values of angular positions of the antenna relative to the first reference heading of the antenna and which system further comprises means for selecting either the first named prestored table of digital values or the another prestored table of digital values to selectively generate a second digital signal representative of the angular position of the antenna relative to either the first or second reference headings.

7. A conversion system as set forth in claim 1 wherein the converting means includes means for producing binary coded digits representative of the angular position relative to the first reference heading and the storage means includes means for producing binary coded digits representative of the angular position relative to the second reference heading.

8. A digital display system for use with a controller for an antenna rotator which includes means for generating an analog signal varying as a function of the angular position of the antenna, the digital display system comprising:

means for converting the analog signal to a corresponding first digital signal representative of the angular position of the antenna relative to a first reference heading of the antenna;

storage means having a prestored table of digital values of angular positions of the antenna relative to a second reference heading of the antenna and which in response to the first digital signal produces a second digital signal corresponding to one of the prestored digital values, the second digital signal thereby being representative of the angular position of the antenna relative to the second reference heading; and means responsive to the second digital signal for displaying digits representative of the angular position of the antenna relative to the second reference heading.

9. A digital display system as set forth in claim 8 wherein the converting means includes means responsive to the analog signal for producing sequences of digital values and for generating control signals identifying which one of the sequence of digital values is being produced, each sequence of digital values produced being representative of the angular position of the antenna relative to the first reference heading of the antenna.

10. A digital display system as set forth in claim 8 wherein the storage means produces sequences of digital values, each sequence of digital values being representative of the angular position of the antenna relative to the second reference heading of the antenna, and which system further comprises control logic for producing control signals identifying which one of the digital values in the sequence is being produced.

11. A digital display system as set forth in claim 10 wherein the converting means includes means responsive to the analog signal for producing second sequences of digital values and for generating second control signals identifying which one of the digital values in the second sequence is being produced, each second sequence of digital values being representative of the angular position of the antenna relative to the first reference heading of the antenna.

12. A digital display system as set forth in claim 11 wherein the displaying means includes means responsive to the first named control signals for digitally displaying a sequence of digits representative of the angular position of the antenna relative to the second reference heading.

13. A digital display system as set forth in claim 11 wherein the control logic responds to the second control signals to identify which one of the digital values in the first named sequence is being produced.

14. A digital display system as set forth in claim 8 wherein the storage means includes another prestored table of digital values of angular positions of the antenna relative to the first reference heading of the antenna and which system further comprises means for selecting either the first named prestored table of digital values or another prestored table of digital values to selectively generate a second digital signal representative of the angular position of the antenna relative to either the first or second reference headings.

15. A digital display system as set forth in claim 8 wherein the converting means includes means for producing binary coded digits representative of the angular position relative to the first reference heading and the storage means includes means for producing binary coded digits representative of the angular position relative to the second reference heading.

16. In a controller for a rotator for rotating an antenna to selected angular positions and generating an analog signal which varies as a function of the angular position of the antenna, a conversion system comprising:

means for converting the analog signal to a corresponding first digital signal representative of the angular position of the antenna relative to a first reference heading;

storage means having a prestored table of digital values of angular positions of the antenna relative to a second reference heading of the antenna and which in response to the first digital signal produces a second digital signal corresponding to one of the prestored digital values, the second digital signal thereby being representative of the angular position of the antenna relative to the second reference heading; and means responsive to the second digital signal for displaying digits representative of the angular position of the antenna relative to the second reference heading.

17. In a control as set forth in claim 16, the converting means including means responsive to the analog signal for producing sequences of digital values and for generating control signals identifying which one of the sequence of digital values is being produced, each sequence of digital values produced being representative of the angular position of the antenna relative to the first reference heading of the antenna.

18. In a controller as set forth in claim 16, the storage means producing sequences of digital values, each sequence of digital values being representative of the angular position of the antenna relative to the second reference heading of the antenna, the conversion system further comprising control logic for producing control signals identifying which one of the digital values in the sequence is being produced.

19. In a controller as set forth in claim 18, the converting means including means responsive to the analog signal for producing second sequences of digital values and for generating second control signals identifying which one of the digital values in the second sequence is being produced, each second sequence of digital values being representative of the angular position of the antenna relative to the first reference heading of the antenna.

20. In a controller as set forth in claim 19, the displaying means including means responsive to the first named control signals for digitally displaying a sequence of digits representative of the angular position of the antenna relative to the second reference heading.

21. In a controller as set forth in claim 19 the control logic responding to the second control signals to identify which one of the digital values in the first named sequence is being produced.

22. In a controller as set forth in claim 16, the storage means including another prestored table of digital values of angular positions of the antenna relative to the first reference heading of the antenna, the conversion system further comprising means for selecting either the first named prestored table of digital values or another prestored table of digital values to selectively generate a second digital signal representative of the angular position of the antenna relative to either the first or second reference headings.

23. In a controller as set forth in claim 16, the converting means including means for producing binary coded digits representative of the angular position relative to the first reference heading, the storage means including means for producing binary coded digits representative of the angular position relative to the second reference heading.

* * * * *